though the shield into the filter
chamber. A valve member is mounted adjacent the inner
end of the shield and controls flow through the shield.
When the valve member is engaged with the shield's inner
end, flow is restricted, when the valve member is spaced
from the shield's inner end, flow is unrestricted. The shield
and the valve are both perforated so that when the valve
is closed, fluid can still pass from the pressure chamber
into the filter chamber at a controlled rate.

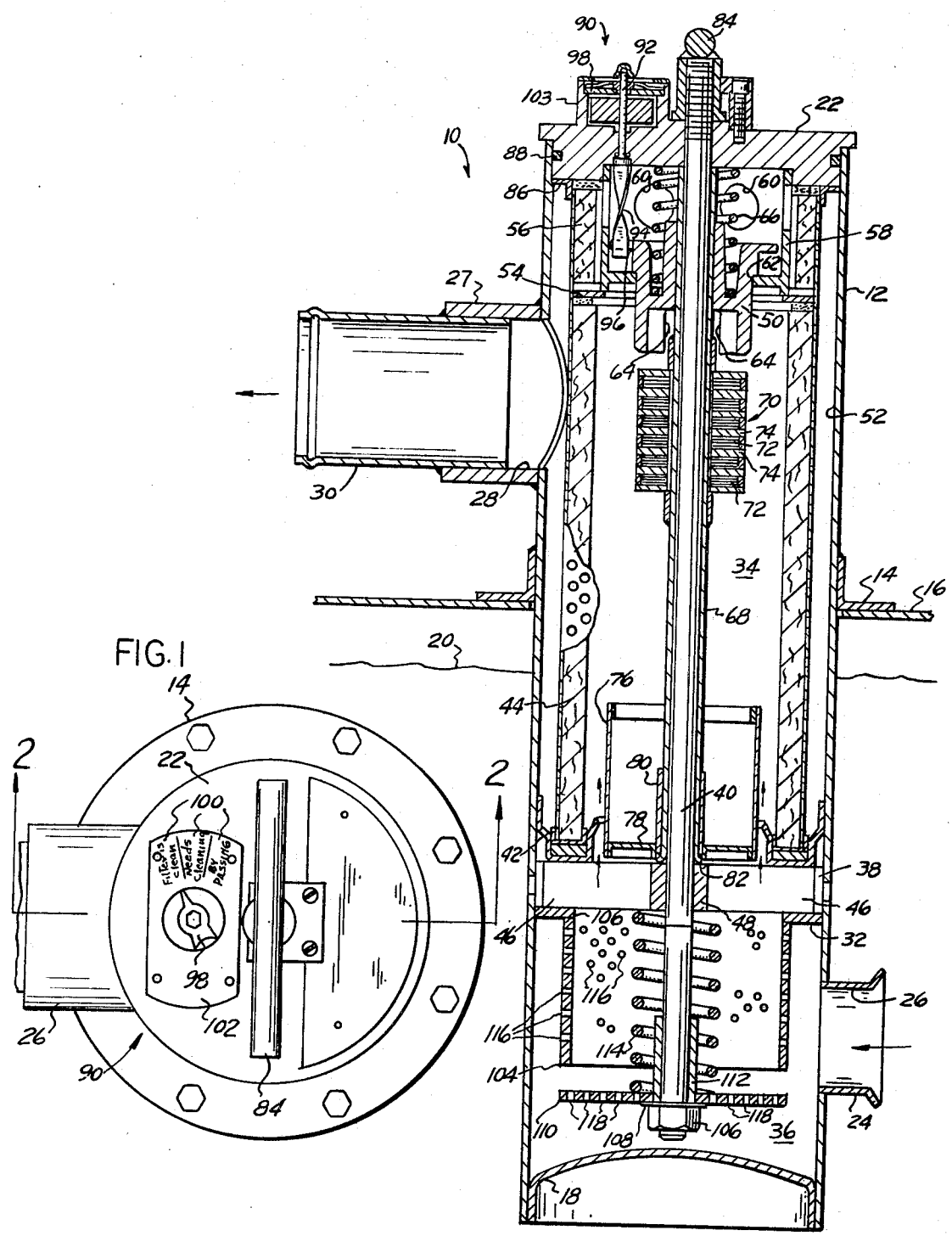

The valve member is spring biased toward its open
position and closes when a sharp increase in fluid flow
entering the pressure chamber is reflected across the valve
in the form of a pressure differential so that the pressure
outside of the valve and the shield is greater than the
pressure within the shield. When the valve closes, the
energy of the pressure wave is dissipated in the pressure
chamber. When the pressure wave has been absorbed in
the pressure chamber, the valve returns toward its open
position.

In summary, the preferred embodiment of the invention
provides a novel filter device having a filter chamber with
filter means for purifying a fluid flowing through a fluid
circuit and a pressure chamber with shock absorbing
means for dissipating the energy of a pressure wave
traveling through the fluid circuit before it enters the filter
chamber so that the internal components of the filter device are protected from damage.

Other advantages of the present invention will readily
become apparent to one skilled in the art to which the
invention pertains upon reference to the following detailed description.

DESCRIPTION OF THE DRAWINGS

The description refers to the accompanying drawing in
which like reference characters refer to like part throughout the several views and in which:

FIG. 1 is a longitudinal sectional view of a filter device
made in accordance with the preferred embodiment of
the invention and incorporated as part of a fluid system which is illustrated schematically; and FIG. 2 is a plan view of the device of FIG. 1.

DESCRIPTION OF THE PREFERRED EMBODIMENT

Now referring to the drawings, a filter device 10 illustrating the preferred embodiment of the invention comprises an elongated, cylindrical, tubular housing 12 having
a flange 14 around its mid-section for mounting the housing to the cover 16 of a fluid reservoir. The housing 12
is normally mounted in an upright position and has a
lower end, closed by a plug 18, extending below the normal fluid level 20 in the reservoir. The upper end of the
housing 12 is closed by a removable cover 22. A flange
24 mounted on the wall of the tubular housing 12 adjacent
its lower end has a flared inlet opening 26 for receiving
fluid from the fluid system. A flange 27 fixedly mounted
near the upper end of the tubular housing 12 above the
reservoir defines a discharge opening 28 for the delivery
of fluid from the housing 12 to a discharge conduit 30.

The tubular housing 12 is internally divided by an annular plate 32 into a filter chamber 34 adjacent the outlet opening 28 and a pressure chamber 36 adjacent the
inlet opening 26. Thus, any fluid flowing through the filter
device must initially pass through the pressure chamber
36 before flowing into the filter chamber 34.

A spider 38 mounted above the plate 32 is fixed to the
lower end of an elongated rod 40 which extends axially
from the cover 22 through the filter chamber 34 and into
the pressure chamber 36. An annular member 42 is fixedly
mounted to the wall of the housing 12 adjacent the spider 38 and forms a seat for a cylindrical, porous filter element 44 disposed in the filter chamber 34. The spider 38 has a plurality of arms 46 extending from a central boss 48 so that fluid can pass axially upwardly from the pressure chamber 36 into the interior of the filter element 44. A bypass valve 50 normally closes the upper end of the filter element 44 so that the fluid normally travels from the interior of the element radially outwardly through its walls to an annular chamber 52 formed between the wall of the filter element 44 and the housing 12. The annular chamber 52 is connected to the outlet opening 28.

An annular plate 54 is disposed on the upper end of the filter element 44 and a second short cylindrical filter element 56 is disposed between the plate 54 and the lower surface of the cover 22. A cylindrical guide member 58 seated on the plate 54 extends from the plate 54 to the inner surface of the cover 22. The guide member 58 has a series of circumferentially spaced ports 60 providing fluid communication between the interior of the guide member 58 through the walls of the filter element 56 to the annular chamber 52. The valve 50 is slidably mounted in a bypass opening 62 of the guide member 58 between a lower closed position where it cooperates with the member 58 in closing the upper end of the filter 44 and an open position where it is raised to a position where three axial slots 64 on its lower end are raised above the opening 62 to permit fluid to flow from the interior of the filter 44 upwardly into the interior of the guide member 58.

A spring 66 mounted below the cover 22 urges the valve 50 downwardly toward its closed position. The tension of the spring 66 is selected so that the pressure differential developed across the walls of the filter 44 because of the accumulation of filtered particles on the interior of the filter 44 produces a force which opens the valve 50 when the filter 44 is clogged.

An elongated sleeve 68 is mounted on the rod 40 and extends from the cover 22 to the spider 48. Magnet means 70 are mounted on the sleeve 68 within the filter 44 and consist of a series of ring-shaped magnets 72 separated by ring-shaped insulators 74. The magnet means 70 attract metallic particles and the like carried in the fluid.

A basket formed of a cylindrical, perforated wall 76 has its lower end closed by a perforated bottom 78 which is joined to a mounting sleeve 80. The sleeve 80 is slidably mounted on the sleeve 68 at the lower inlet end of the filter 44. The lower end of the sleeve 68 is flared at 82 in order to retain the basket in position. The basket provides means for collecting filtered material which tends to fall off the inner walls of the filter 44 as it is removed from the chamber 52.

A handle 84 is threadably mounted on the upper end of the rod 40 and provides means for clamping the cover 22 in place. The cover 22 is seated on an annular locating flange 86 which also positions the end of the upper filter 56. The cover 22 has an O-ring 88 providing a fluid tight seal between the cover 22 and the housing 12.

Indicating means 90 mounted on the cover 22 and coupled with the valve 50 provide means for visually indicating the condition of the filter 44 as reflected in the position of the valve 50. Indicating means 90 includes a short rod 92 which extends through the cover 22 and carries a longitudinally twisted actuating member 94 on its inner end. The actuating member 94 is slidably disposed in a slot 96 of the valve 50 so that the linear motion of the valve is converted into rotary motion of the shaft 92. A pointer 98 carried at the upper end of the shaft 92 registers with indicia 100 formed on a plate 102 which is mounted on a boss 103 of the cover 22.

A short tubular shield 104 is mounted in the pressure chamber 36 with its upper end fixedly attached to the plate 32 around the perimeter of a central opening 106 in the plate 32. The lower end of the shield extends down into the pressure chamber 36 a sufficient distance so that the fluid flowing through the inlet 26 is initially directed against the wall of the shield 104 as it enters the pressure chamber 36. A nut 106 and a washer 108 carried at the lower end of the rod 40 support a valve member 110. The valve member 110 is mounted on a short sleeve 112 for up and down movement with respect to the lower end of the shield 104. A spring 114 mounted between the valve 110 and the spider 46 biases the valve down and away from the lower end of the shield 104 so that fluid can flow from the pressure chamber 36 up through the lower end of the shield 104 toward the filter chamber 34 in a relatively unrestricted manner.

The shield 104 has a series of perforations 116 in its wall opposite the inlet 26. The valve member 110 also has a plurality of perforations 118 so that when the valve 110 is in its closed position, engaged with the lower end of the shield 104, the flow from the pressure chamber 36 through the shield 104 is restricted to a rate determined by the perforations 118 and 116. The lower surface of the valve 110 is substantially exposed to the pressure existing within the chamber 36 outside of the shield 104, and the upper surface of the valve member 110 is exposed to the pressure existing within the shield 104. A sudden increase in the flow rate into the pressure chamber 36 causes a greater pressure on the outside of the shield 104 than exists on the inside. This pressure differential produces a net force acting upwardly against the lower surface of the valve 110 which tends to move the valve to its closed position against the bias of the spring 114. The spring 114 is chosen so that it yields to a predetermined pressure differential across the valve 110. Thus, a shock wave entering the pressure chamber 36 causes the valve 110 to close so that the rate at which fluid flows from the pressure chamber 36 to the filter chamber 34 is determined by the size and number of the perforations 116 and 118. As the shock wave dissipates in the pressure chamber 36, the pressure differential across the valve 110 lowers until the spring 114 can move the valve 110 to its open position. The sensitivity of the valve 110 can be varied by replacing the spring 114 with a lighter spring to cause the valve to close under a lesser shock wave or by a heavier spring to cause the valve to close under the influence of a greater increase in the fluid flow rate.

It is to be understood that I have described a novel filter element incorporating shock absorbing means for automatically reducing the intensity of a shock wave traveling through the fluid system toward the filter element to a value that the internal components of the filter can tolerate without stopping fluid flow through the filter.

Athough I have described but one embodiment of my invention, it is to be understood that various changes and revisions can be made therein without departing from the spirit of the invention as expressed in the scope of the apended claims.

Having thus described my invention, I claim:

1. A fluid filter device comprising:
   an elongated tubular housing, having an inlet for receiving unfiltered fluid and an outlet for discharge of filtered fluids;
   means forming a fluid reservoir;
   means for mounting said housing with one end below the fluid level in said reservoir and the opposite end above the fluid level in said reservoir;
   means dividing said housing into a pressure chamber in communication with said inlet and a filter chamber in communication with said outlet;
   a cylindrical filter element disposed in said filter chamber in the path of fluid delivered from said pressure chamber for filtering fluid introduced from said pressure chamber;
   a rod and means mounting said rod within said tubular housing so that it extends through said filter chamber into said pressure chamber;
   valve means in said pressure chamber for controlling the flow of fluid from said pressure chamber into said filter chamber comprising:

a tubular shield mounted in said pressure chamber with its longitudinal axis coinciding with the axis of said rod, said tubular shield having one end arranged for the discharge of fluid into said filter chamber and its other end supported in said pressure chamber adjacent said inlet;

a valve member having a pressure responsive surface;

means mounting said valve member on said rod in said pressure chamber for movement relative to the inner end of said tubular shield between a closed position wherein said valve member engages the inner end of said shield to form a barrier to fluid flow from said pressure chamber, and an open position wherein said valve member is spaced from the inner end of said shield to permit unrestricted fluid flow from said pressure chamber axially through said shield, said valve member being mounted with its pressure responsive surface exposed to the fluid pressure in said pressure chamber outside of said shield; and spring means normally biasing said valve member toward its open position, said spring means being yieldable to a force produced on a pressure responsive surface of said valve member toward its closed position by a sharp increase in the flow rate of the stream entering said pressure chamber through said inlet;

by-pass means in said filter chamber having a by-pass opening for fluid to pass through said filter chamber by-passing the filter in said filter chamber; and a second valve mounted on said rod and movable between a closed position wherein said second valve engages said by-pass opening so that all of the fluid entering said fluid chamber from said pressure chamber passes through said filter in filtering relationship, and in open position permitting at least a portion of the fluid entering the filter chamber from the pressure chamber to by-pass the filter.

2. A filter device as defined in claim 1, wherein said filter element is cylindrical in shape with its longitudinal axis coinciding with said rod and its walls formed with a diameter smaller than the diameter of the tubular housing to form an annular chamber between said filter and said housing connected with the outlet of said filter chamber, and including means for mounting said filter in said filter chamber so that fluid entering said fluid chamber from said pressure chamber passes axially into one end of said filter, and means mounting said second valve to normally close the opposite end of said cylindrical filter so that fluid passes from the interior of said filter radially outwardly to said annular chamber.

3. A fluid filter device comprising:

a housing having an inlet for receiving unfiltered fluid and an outlet for discharge of filtered fluid;

means dividing said housing into a pressure chamber in communication with said inlet and a filter chamber in communication with said outlet;

filter means disposed in said filter chamber for filtering fluid introduced from said pressure chamber;

a rod and means mounting said rod within said housing so that it extends through said filter chamber and into said pressure chamber;

valve means in said pressure chamber for controlling the flow of fluid from said pressure chamber into said filter chamber comprising:

a tubular shield mounted in said pressure chamber with one end arranged for the discharge of fluid into said filter chamber and its other end supported in said pressure chamber for receiving fluid from said inlet;

a valve member having a pressure responsive surface;

means mounting said valve member on said rod in said pressure chamber for movement relative to said other end of said shield between a closed position wherein said valve engages said shield end to form a barrier to fluid flow from said pressure chamber into said shield, and an open position wherein said valve member is spaced from said other end of said shield to permit unrestricted flow from said pressure chamber through the end of said shield towards said filter chamber, said valve being mounted with its pressure responsive surface exposed to the fluid pressure in said pressure chamber outside of said shield;

means normally biasing said valve member toward its open position, said means being yieldable to a force produced on the pressure responsive surface of said valve member toward its closed position by a sharp increase in the flow rate of the stream entering said pressure chamber through said inlet; and by-pass means in said filter chamber having a by-pass opening for fluid to pass through said filter chamber by-passing the filter means in said filter chamber; and a second valve mounted on said rod and movable between a closed position wherein said valve engages said by-pass opening so that all of the fluid entering said fluid chamber from said pressure chamber passes through said filter means in a filtering relationship, and an open position permitting at least a portion of said fluid entering the fluid chamber from the pressure chamber to by-pass the filter means.

4. The combination as defined in claim 3, including means provided a fluid connection between said pressure chamber and said filter chamber when said valve member is closed to provide a controlled fluid flow toward said filter means.

5. The combination as defined in claim 3, wherein said shield is perforated to provide a controlled flow from said pressure chamber to said filter chamber when said valve member is closed.

6. The combination as defined in claim 3, wherein the inlet of said pressure chamber is positioned to receive the fluid radially to the longitudinal axis of said tubular shield and against the outer side wall of said shield.

7. The combination as defined in claim 3, wherein the inlet to said filter chamber and the inlet to said pressure chamber are at right angles to one another, and said tubular shield is mounted in the inlet of said filter chamber so that it extends into said pressure chamber with its side wall facing said pressure chamber inlet, and said valve member and wall of said shield opposite said pressure chamber inlet are perforated to permit a controlled fluid flow into said shield for delivery to the inlet of said filter chamber when said valve member is closed by a sharp increase in the flow rate of the fluid stream.

8. The combination as defined in claim 3, wherein said shield is mounted in said pressure chamber with its longitudinal axis coinciding with the axis of said rod, said valve member being mounted on said rod for axial movement toward and away from the end of said shield, and said biasing means comprising a spring mounted on said rod for urging said valve away from said shield end toward its open position.

9. The combination as defined in claim 3, including means forming a fluid reservoir; said housing comprising a tubular member; means for mounting said tubular member with one end below the fluid level in said reservoir and its upper end above the fluid level in said reservoir; said filter means comprising a cylindrical filter element disposed in said filter chamber in the path of the fluid delivered from said pressure chamber, the longitudinal axis of said filter element coinciding with said rod and its walls formed with a diameter smaller than the diameter of the tubular member to form an annular chamber between said filter in said tubular member connected with the outlet of said filter chamber and including means for mounting said filter in said filter chamber so that the fluid entering said filter chamber from said pressure chamber passes axially into one end of said filter; and, means mounting said second valve to normally close the opposite end of said cylindrical filter so that the fluid passes from the interior of said filter radially outwardly through said annular chamber.

References Cited

UNITED STATES PATENTS

| | | | |
|---|---|---|---|
| 2,919,655 | 1/1960 | Poettmann | 137—513.3 X |
| 2,947,151 | 8/1960 | Schilling | 137—513.3 X |
| 3,039,485 | 6/1962 | Brohl | 210—349 |
| 3,228,523 | 1/1966 | Korte et al. | 210—349 X |
| 3,323,648 | 6/1967 | Rosaen | 210—90 |

SAMIH N. ZAHARNA, Primary Examiner

U.S. Cl. X.R.

137—513.3; 210—134, 172, 349

UNITED STATES PATENT OFFICE
CERTIFICATE OF CORRECTION

Patent No. 3,512,645        Dated May 19, 1970

Inventor(s)  N. O. ROSAEN

It is certified that error appears in the above-identified patent and that said Letters Patent are hereby corrected as shown below:

Column 1, line 63, after "contaminates" insert
    --before the fluid--

Column 1, line 65, after "controls" insert
    --the rate of--

Column 3, line 29, after "urges the" insert
    --bypass--

Column 4, line 37, after "valve" insert
    --member--

Column 4, line 54, change "apended" to
    --appended--

Column 6, line 37, change "provided" to
    --providing--

SIGNED AND
SEALED
SEP 15 1970

(SEAL)
Attest:

Edward M. Fletcher, Jr.
Attesting Officer

WILLIAM E. SCHUYLER, JR.
Commissioner of Patents